Oct. 6, 1936.   F. B. DAY ET AL   2,056,932
CREAM MAKING MACHINE
Filed March 27, 1936

INVENTORS
FRANK BERRITT DAY
ALBERT RICHARD BANNISTER
BY
Richards & Geier
ATTORNEYS

UNITED STATES PATENT OFFICE 2,056,932

CREAM MAKING MACHINE

Frank Berritt Day, Kingston-on-Thames, and Albert Richard Bannister, Sunbury-on-Thames, England Application March 27, 1936, Serial No. 71,110
In Great Britain September 13, 1934

2 Claims. (Cl. 99—267)

The present invention relates to an emulsifier or homogenizer machine and it particularly relates to a compact household device suitable for making cream from butter and milk in the household or for making other mixtures, fluids or liquids for domestic use.

In prior applications, Serial No. 656,122 filed February 10, 1933 and Serial No. 721,458 filed April 20, 1934, are disclosed compact household homogenizer or emulsifier devices of relatively simple construction, which include a bowl or container for the mixture of butter and milk to be emulsified, a stand or support upon which said bowl may be mounted, a cylinder and piston arrangement having an inlet from the bowl or container and a highly restricted outlet or emulsifier valve, and a lever adapted to be manually actuated and connected to said piston to reciprocate the same alternately to draw a charge of the butter and milk mixture from the bowl and force said charge past the highly restricted outlet to a suitable receptacle for receiving the cream or emulsified mixture.

In one preferred construction disclosed in said prior applications, the manually actuated lever extends diametrically across the bowl and by a vertical reciprocation of the end thereof, not only was the piston caused to reciprocate, but an agitating action was caused to take place assuring a thorough preliminary mixture of the milk, butter or other components to be combined before such components were drawn into the cylinder by the piston and forced out of the cylinder past the emulsifying restriction.

In this preferred construction, the lever was pivotally mounted at one side of the bowl while the handle was positioned at the other side of the bowl with the lever being intermediately connected to cause said agitation and reciprocate said plunger.

In the second mentioned application, Serial No. 721,458, the lever was caused to extend diametrically across the top of the bowl and was pivotally mounted on one side of the bowl by a detachable pivot bolt connection enabling ready dismantling. The bowl was fixed to the stand so as to remain relatively still throughout reciprocation of the plunger. The agitator consisted of a ringlike member depending from the lever within the bowl or container and encircling the cylinder. The cylinder projected up through the bottom of the bowl and was provided with a series of ports at the bottom of the bowl, which were alternately opened and cut off by the piston during its reciprocating movement to permit charging and discharging of the cylinder.

In addition, in said second application, provision was made for desalting butter, the butter being heated with hot water to melt the same and then poured into the bowl or container of the machine. The emulsifier nut or valve was so attached to the lower end of the cylinder that it might be readily removed. Then when the piston was raised to uncover the ports in the side of the cylinder, the salty water which would settle to a lower level than the molten butter might flow out of the bowl.

When all such salty water had been removed from the container, the inlet ports were closed by lowering the piston, the milk was poured in proper proportion into the bowl, the agitator was reciprocated slightly without opening the inlet ports to insure a thorough preliminary mixture and finally, after the emulsifier nut had again been applied, the device was actuated to force the mixture past the restriction to form cream or some other desired emulsion.

It is among the objects of the present application to provide an emulsifier or homogenizing device containing the advantages of the constructions above described and set forth and disclosed in said copending applications, but which device would be particularly adapted to be utilized for making smaller quantities of cream and which device was adapted to be made of other materials than aluminum which was found to be the preferred material for the constructions above described.

Other objects will appear and be obvious during the course of the following specification.

In accomplishing the above objects, it has been found satisfactory in connection with one preferred embodiment to make the container of a small, yet strong and sturdy bowl of a molded plastic material, such as bakelite, but it is to be understood that other plastic and resinous materials may also be employed.

This bowl was preferably screwed into or otherwise connected to a jar, which not only formed the support for the apparatus but in addition served as a convenient, protected receptacle to receive the emulsified or homogenized mixture.

The piston and cylinder were preferably made of metal, such as aluminum, and the homogenizer was of such a construction and was positioned as to readily enable desalting of the butter.

The connections between the piston and the agitator were preferably all formed of a single sheet metal stamping.

The above and other objects will appear more clearly from the following detailed description when taken in connection with the accompanying drawing, which illustrates a preferred embodiment of the inventive idea.

Figure 1:
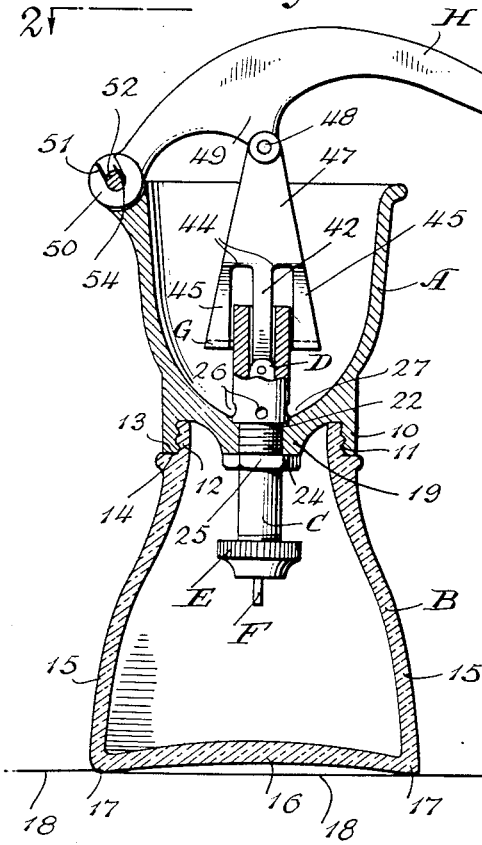
Figure 1 is a side sectional view of the entire device showing the cylinder and piston in partial section, and the bowl and the supporting receptacle in full section upon the line 1—1 of Figure 2.

Referring to the drawing, the homogenizer and emulsifier device consists of a bowl or container A to receive the liquids or fluids to be emulsified together, a supporting bowl or jar B to receive the emulsified mixture and form a support for the bowl A, a cylinder C receiving a piston D, said cylinder being attached to the bottom of the bowl A and extending downwardly into the jar B, an emulsifier or homogenizer nut E receiving the emulsifier or homogenizer valve F, an agitator G and an actuating lever H.

Although the bowl A might be made of glass or metal, it is preferably made of a molded plastic material such as bakelite although other phenol formaldehyde, urea-formaldehyde, vinyl, casein, or cellulose plastics might be employed.

The bowl B also preferably might be made of these various materials, but in the form shown is made of glass.

The bowl A is provided with a depending lip 10, the interior of which is threaded, as indicated at 11, to screw onto the upwardly extended threaded nipple portion 12 of the bowl B, the lower end 13 of the section 10 of the bowl being tightened against the shoulder 14 on the glass jug B, and thus forming a liquid tight seal.

It will be noted that the bowl is curved downwardly and outwardly at 15 and the exterior thereof might be ridged or corrugated to enable more ready gripping thereof by the hand of the user who would be holding a bowl against a table, shelf or other support during the emulsifying operation.

The bottom of the bowl B is domed, as indicated at 16 so that there would be an edged contact at 17 to assure greater stability of the bowl B upon the table support such as indicated at 18.

The bowl A is centrally provided with a lower depending portion 19 (see Fig. 3) having the central opening 20 and the peripheral recess 21, said shoulder 21 stopping the cooperating shoulder 22 on the cylinder C.

Below the shoulder 22, the cylinder member is of reduced diameter as indicated at 23, and it is provided with a threaded portion, as indicated at 24 extending through the opening 20 and receiving the clamping nut 25 below said opening by which the shoulder 22 of the cylinder may be drawn tightly up against the recess 21 in the bottom of the bowl A.

The cooperating recess 21 (see Fig. 3) and the shoulder 22 are preferably so arranged that the symmetrically positioned bores or ports 26, shown illustratively as four in number would be positioned approximately at the bottom 27, enabling complete draining of the bowl A through said ports.

The lower part of the cylinder 23 is threaded, as indicated at 28 (in Fig. 3) to receive the tapped socket 29 of the emulsifier nut E.

The emulsifier nut is provided with a recess 30 having a plurality of spaced bores 31 in the bottom thereof serving as outlets and with a central elevated nipple 32. This nipple is provided with a bore receiving the pin 33 extending downwardly from the disk 35 of the valve member F.

The outer edges of the disk are bevelled as indicated at 36 to contact with the edge 37 of the recess 38 at the bottom of the cylinder C, the nut E being adapted to be screwed up until said bevel 36 is so closely jammed against the edge 37 as to form an outlet of high restriction to emulsify the mixed components such as butter and cream.

The cylinder C may be made of aluminum or some other metal, as may be desired, and the piston D which projects into the upper end of the cylinder is preferably made of a similar material and is provided with a very close fit in said cylinder C.

Figure 3:
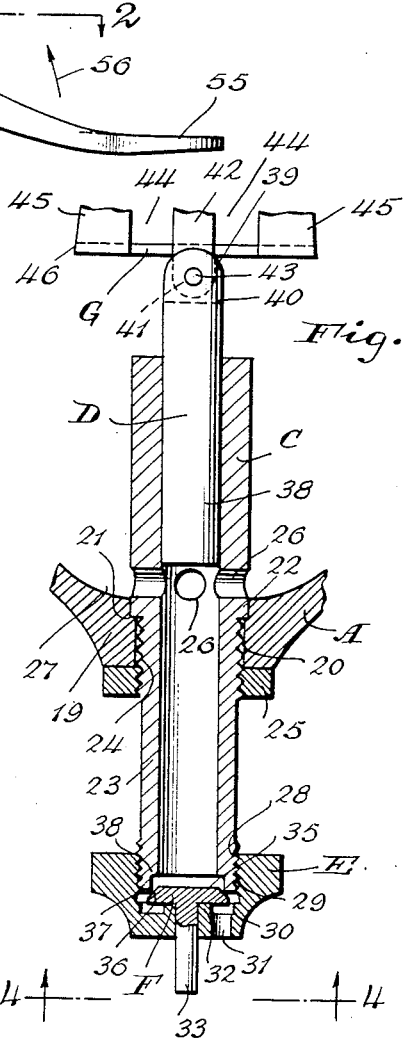
Figure 3 is a detailed sectional view upon enlarged scale upon the line 3—3 of Figure 2 showing the entire cylinder in section and also showing the emulsifier valve after it has been screwed tightly in position.

It will be noted that the ports 26 are opened when the piston D is elevated to the position shown in Figure 3 but will be closed as soon as the lower end 38 of the piston closes such ports.

When the piston is drawn up in the position indicated in Figure 3, the liquid may flow from the bowl A into the lower portion 23 of the cylinder C to fill said lower cylinder portion.

Then, upon the next downward stroke of the piston D the ports 26 will be cut off and the mixture will be forced past the high restriction 36—37 and through the openings 31 into the bowl B.

Where the liquid is in two layers in the bowl A, as where a layer of butter is above a layer of salty water, the lifting of the piston D (with the homogenizer nut E and valve F removed), it will permit the salty water to escape and when the butter commences to trickle through, the piston D may be lowered to cut off further drainage from said bowl A.

The upper portion of the piston D may be rounded, as indicated at 39 in Figure 3, and slotted at 40 to receive the lower end 41 of the section 42 of the connecting link and agitator G.

The lower end of the section 42 is provided with a pivotal connection, as indicated at 43 within said slot 40.

Figure 2:
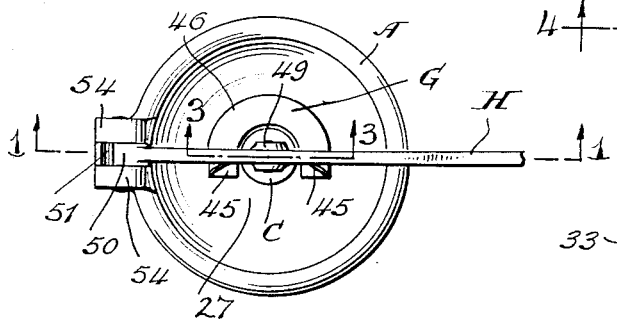
Figure 2 is a top view of the device of Figure 1 upon the line 2—2 of Figure 1 with the end of the handle removed showing the interior of the bowl and the shape of the agitator flange.
Figure 4:
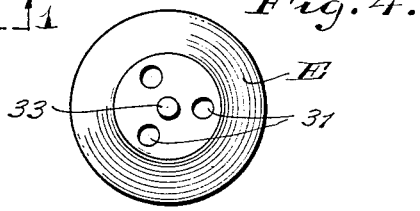
Figure 4 is a bottom view of the emulsifier nut removed from the assembly of Figure 3 upon the line 4—4 of Figure 3.

The agitator G is preferably formed of one sheet of metal which is slotted, as indicated at 44, to form the section 42 and provide enough clearance for the sides of the cylinder C, as best shown in Figure 1, the side members 45 extending downwardly and outwardly as shown in Figure 2 to the flange 46 which is turned out horizontally, as indicated best in Figure 2. The flange 46 extends around the cylinder C and serves to agitate the contents of the bowl during the reciprocation of the piston D.

The upper end of the blade 47 of the agitator G is pivotally connected at 48 to the depending ear 49 on the lever H.

The lever H, as shown in Figure 2, extends diametrically across the top of the bowl A and is provided with a round 50 at one end, slotted at 51 to be inserted onto and caught under the pivot pin 52 fixed on the separated ears 54 projecting outwardly from the side of the bowl A.

The other end of the lever is provided with a flattened portion 55 which enables a convenient gripping of the lever H and ready actuation thereof.

In dismantling the apparatus, as shown assembled in Figure 1, the lever H may be thrown in the direction indicated by the arrow 56 until the piston D has been removed from the cylinder C and then the lever is turned over sufficiently to enable disengagement between the slot 51 and the pivot pin 52.

The emulsifier nut E may be readily removed for cleaning or dismantling by unscrewing it from the bottom of the cylinder C and the cylinder C may be removed by loosening and removing the nut 25, which may also be threaded over the thread 28.

The bowl A in turn may be readily removed from the jar B by disconnection between the threaded portions 11 and 12.

The assembly may be done in the reverse.

It is thus apparent that there is provided a very simple emulsifier or homogenizer of inexpensive construction which may be made in very small sizes and which may be constructed to sell at a sufficiently low price to attract the interest of a most economical householder.

The bowls A and jars B are very inexpensive to manufacture and the device may be readily assembled or dismantled for cleaning and it does not readily get out of order.

In making cream from salt butter, the required amount of butter is placed in a saucepan with the required amount of water and allowed to boil for a minute with occasional stirring. After the butter has all been melted, the mixture is poured into the bowl of the machine and allowed to settle for two minutes. This permits the butter to rise to the surface and the salty water to separate as a bottom layer, where it may be removed through the ports 26, as previously described, after the piston D has been raised to uncover the ports 26 and the nut E has been removed.

The water will at first run out quickly, but as soon as this assumes a yellow color, indicating that all the water has been removed and butter is beginning to flow through, the lever H is depressed to close the ports 26. The nut E and valve F are then replaced.

The proper amount of milk is then added to the bowl A containing the molten desalted butter and the lever H is slightly reciprocated to cause the mixture of the milk and molten butter without opening the ports 26.

When sufficient mixture has taken place, the piston D is raised sufficiently to open the ports 26, and the handle H is reciprocated sufficiently to cause a full discharge and charging stroke of the piston D upwardly past the inlet ports 26 and downwardly sufficiently to cause a full discharge through the emulsifier restriction E—F.

To get the best results butter, milk and water should be mixed together in the following proportions; the water being first used to desalt the butter before the milk is added as described above:

|  | Salt butter | Milk | Water |
|---|---|---|---|
| Extra thick whipping cream | 1½ oz. | 2 oz. | 4 oz. |
| Approximately 32% cream | 1½ oz. | 2 oz. | 2½ oz. |
| Approximately 24% cream | 1 oz. | 2 oz. | 2 oz. |
| Approximately 16% cream | ½ oz. | 2 oz. | 1 oz. |

To make cream from unsalted butter, the butter and cream may be melted together in a saucepan and allowed to cool until the mixture reaches blood heat then the cool mixture is stirred and poured into the container A and the pump is started after a few short agitating strokes of the agitator G.

With such sweet butter, the following proportions may be employed.

|  | Sweet butter | Milk |
|---|---|---|
| Extra thick whipping cream | 1½ oz. | 2 oz. |
| Approximately 32% cream | 1½ oz. | 2 oz. |
| Approximately 24% cream | 1 oz. | 2 oz. |
| Approximately 16% cream | ½ oz. | 2 oz. |

In adidtion to what has been disclosed above, other fluids may be emulsified together such as egg yoke, salad oil and vinegar to form mayonnaise, gin or whiskey and flavoring materials to form palatable drinks, and so forth.

Of course many changes in the structures and methods described above may be made without departing from the essential features of the present invention and it is intended to include all such changes and modifications.

What is claimed by this invention and desired to be secured by Letters Patent is:

1. A domestic emulsifying or homogenizing machine particularly adapted for making cream out of salt or sweet butter and milk and adapted to be operated by a housewife or other person without the use of power, comprising a bowl or container to receive the liquid mixture to be homogenized or emulsified, a support for said bowl or container to receive the liquid mixture to be homogenized or emulsified, a cylinder provided with an inlet port from the lower portion of said bowl or container and an outlet port to discharge the liquid mixture, said outlet port being provided with a highly restricted outlet connection causing emulsification, a piston in said cylinder to cause charging through the inlet port and discharge through the outlet port and a manually actuated lever connected to operate said piston and cause reciprocation thereof in said cylinder, said lever being provided with a link connection to the piston, said link consisting of a sheet metal stamping, the upper end of which is pivotally connected to the lever and the lower edge of which has a central cut-out leg pivotally connected to one end of the piston and an outside semi-circular rim to encircle the cylinder and form an agitator.

2. A domestic emulsifying or homogenizing machine particularly adapted for making cream out of salt or sweet butter and milk and adapted to be operated by a housewife or other person without the use of power, comprising a bowl or container to receive the liquid mixture to be homogenized or emulsified, a support for said bowl or container to receive the liquid mixture to be homogenized or emulsified, a cylinder provided with an inlet port from the lower portion of said bowl or container and an outlet port to discharge the liquid mixture, said outlet port being provided with a highly restricted outlet connection causing emulsification, a piston in said cylinder to cause charging through the inlet port and discharge through the outlet port and a manually actuated lever connected to operate said piston and cause reciprocation thereof in said cylinder, the outlet end of said cylinder being threaded and interiorly recessed and said outlet connection including a cup shaped nut screwed on to the end of said cylinder, the base of which nut is provided with a central bored nipple and with spaced outlet bores encircling said nipple, and a flat valve, the exterior edge of which is bevelled and provided with a dependent stem fitting in the bore of said nipple, said bevelled edge being clamped against said recessed portion of the cylinder by said nut.

FRANK BERRITT DAY.
ALBERT RICHARD BANNISTER.